United States Patent

Inokuchi et al.

Patent Number: 6,147,157

Date of Patent: Nov. 14, 2000

[54] WATER-BASE SILICONE COMPOSITION

[75] Inventors: Yoshinori Inokuchi; Satoshi Kuwata, both of Gunma-ken, Japan

[73] Assignee: Shin-Etsu Chemical Co., Ltd., Tokyo, Japan

[21] Appl. No.: 09/089,405

[22] Filed: Jun. 3, 1998

[30] Foreign Application Priority Data

Jun. 4, 1997 [JP] Japan ................................. 9-146527

[51] Int. Cl.⁷ ........................................ C08F 2/16
[52] U.S. Cl. ..................................... 524/837; 524/588
[58] Field of Search ................................ 524/837, 588

[56] References Cited

U.S. PATENT DOCUMENTS

| | | | |
|---|---|---|---|
| 4,496,687 | 1/1985 | Okada et al. | 524/859 |
| 5,102,930 | 4/1992 | Nakazato et al. . | |
| 5,232,611 | 8/1993 | Ohashi et al. | 252/8.6 |
| 5,254,621 | 10/1993 | Inoue et al. | 525/837 |
| 5,827,921 | 10/1998 | Osawa et al. | 524/837 |

FOREIGN PATENT DOCUMENTS

| | | |
|---|---|---|
| 535649 | 4/1993 | European Pat. Off. . |
| 657517 | 6/1995 | European Pat. Off. . |

*Primary Examiner*—Robert Dawson
*Assistant Examiner*—Jeffrey B. Robertson
*Attorney, Agent, or Firm*—Millen, White, Zelano & Branigan, P.C.

[57] ABSTRACT

Provided by the invention is a water-base silicone composition suitable for the surface treatment of, in particular, rubber articles as the substrate to impart the surface with excellent abrasion resistance and lubricity. The composition comprises, as dissolved or dispersed in an aqueous medium: (A) 100 parts by weight of a diorganopolysiloxane, e.g., dimethylpolysiloxane, terminated at each molecular chain end with alkoxy or hydroxyl group and having a specified degree of polymerization; (B) 0.01 to 10 parts by weight of an organotrialkoxy silane compound such as methyl triethoxy silane; (C) 1 to 10 parts by weight of an organoalkoxy silane compound containing an amido group and a carboxyl group in the molecule such as a reaction product of 3-amino-propyl triethoxy silane and maleic anhydride; (D) 1 to 10 parts by weight of an organoalkoxy silane compound having an epoxy group in the molecule such as 3-glycidoxypropyl trimethoxy silane; and (E) 0.01 to 10 parts by weight of a curing catalyst.

21 Claims, 2 Drawing Sheets

WATER-BASE SILICONE COMPOSITION

BACKGROUND OF THE INVENTION

The present invention relates to a water-base silicone composition or, more particularly, to a water-base composition containing an organopolysiloxane as the principal ingredient and suitable as a coating agent of rubber articles and fibrous materials to form a coating film thereon exhibiting excellent adhesion to the substrate surface and having excellent abrasion resistance and surface lubricity.

It is an established technology in the prior art that various kinds of rubber articles can be imparted with improved lubricity and abrasion resistance by coating the surface with a silicone resin composition. For example, Japanese Patent Publication 60-50226 discloses a method for the surface treatment of a rubber article with a composition comprising an organopolysiloxane having epoxy groups and an amino group-containing organosilane and/or organopolysiloxane. Further, Japanese Patent Publications 54-43023 and 56-47864 disclose a method for the surface treatment of a rubber article with a composition comprising an organopolysiloxane having hydroxyl groups with admixture of an organohydrogenpolysiloxane. Japanese Patent Kokai 7-109440 discloses a method of surface treatment with a composition comprising an organopolysiloxane having hydroxyl groups, an organohydrogenpolysiloxane and a hydrolysis-condensation product of an amino group-containing dialkoxy silane. Japanese Patent Publication 4-80072 discloses a method of surface treatment with a composition comprising a hydroxyl or vinyl group-containing organopolysiloxane, an organohydrogenpolysiloxane and a dimethylpolysiloxane. Japanese Patent Kokai 7-196984 discloses a method of surface treatment with a composition comprising a hydrolyzable group-containing organopolysiloxane, an organopolysiloxane containing epoxy or amino groups and hydrolyzable groups and an organosilane containing an epoxy or amino group and a hydrolyzable group. Japanese Patent Kokai 7-233351 discloses a method of surface treatment with a composition containing a hydroxyl group-containing organopolysiloxane, a hydrolysis-condensation product of an epoxy group-containing dialkoxysilane, a hydrolysis-condensation product of an amino group-containing dialkoxy silane and a fine powder of a silicone rubber.

When these silicone compositions prepared by the above mentioned prior art methods are used for surface treatment of a rubber substrate, however, the coating layer formed therefrom is defective in the poor adhesion to the substrate surface and insufficient abrasion resistance and surface lubricity so that development of a novel silicone-based composition free from these disadvantages is eagerly desired.

SUMMARY OF THE INVENTION

The present invention accordingly has an object to provide a novel water-base composition useful as a surface treatment agent on a rubbery substrate surface without the above mentioned problems and disadvantages in the conventional silicone-based coating compositions.

Thus, the water-base silicone composition provided by the present invention comprises, as dissolved or dispersed in an aqueous medium:

(A) 100 parts by weight of a diorganopolysiloxane of a straightly linear molecular structure having a complex viscosity in the range from $1\times10^4$ to $1\times10^8$ centipoise at 25° C. and represented by the general structural formula

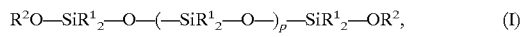

$$R^2O\!-\!SiR^1{}_2\!-\!O\!-\!(\!-\!SiR^1{}_2\!-\!O\!-\!)_p\!-\!SiR^1{}_2\!-\!OR^2, \quad (I)$$

in which $R^1$ is an unsubstituted or substituted monovalent hydrocarbon group having 1 to 20 carbon atoms, $R^2$ is a hydrogen atom or a mono-valent hydrocarbon group having 1 to 6 carbon atoms and the subscript p is a positive integer in the range from 800 to 20000;

(B) from 0.01 to 10 parts by weight of an organotrialkoxy silane compound represented by the general formula

$$R^3Si(OR^4)_3, \quad (II)$$

in which $R^3$ is an unsubstituted or substituted monovalent hydrocarbon group having 1 to 20 carbon atoms and $R^4$ is a monovalent hydrocarbon group having 1 to 6 carbon atoms or a partial hydrolysis-condensation product thereof;

(C) from 1 to 10 parts by weight of an organoalkoxysilane compound containing an amido group and a carboxyl group in the molecule or a partial hydrolysis-condensation product thereof;

(D) from 1 to 10 parts by weight of an organoalkoxy silane compound containing an epoxy group in the molecule or a partial hydrolysis-condensation product thereof; and (E) from 0.01 to 10 parts by weight of a curing catalyst.

DETAILED DESCRIPTION OF THE PREFERRED EMBODIMENTS

Figure 1:
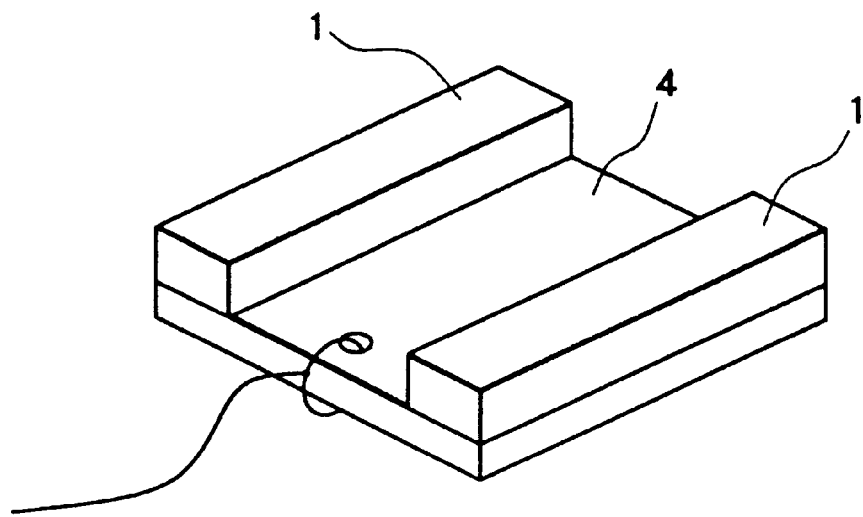
FIG. 1 is a perspective view of the specimen for the measurement of the kinematic friction coefficient of the rubber surface.
Figure 2:
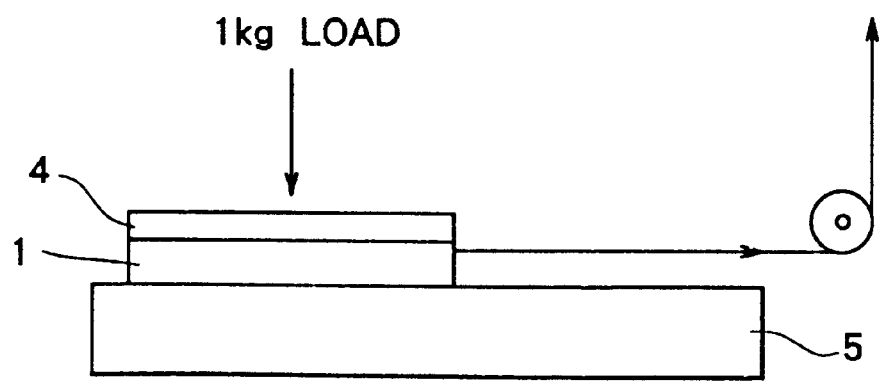
FIG. 2 is a side view of the testing assembly for the measurement of the kinematic friction coefficient of the rubber surface.

The component (A) in the inventive water-base silicone composition is a diorganopolysiloxane of a straightly linear molecular structure as represented by the above given general formula (I) having a complex viscosity in the range from $1\times10^4$ to $1\times10^8$ centipoise or, preferably, from $1\times10^5$ to $1\times10^7$ centipoise at 25° C. by adequately selecting the value of the subscript p in the range from 800 to 20000. The complex viscosity can be readily determined by using various types of commercially available metering instruments at a low fixed frequency such as 0.1 radian/second. Suitable instruments available on the market include those sold under the trade names of Controlled Stress Rheometer Model CS manufactured by Bohlin Co. and Ares Viscoelasticity Measuring System for Fluid manufactured by Rheometric Scientific Co.

In the general formula (I), the groups denoted by $R^1$ are each, independently from the others, a monovalent hydrocarbon group having 1 to 20 carbon atoms exemplified by alkyl groups such as methyl, ethyl, propyl, butyl, pentyl, hexyl, heptyl, octyl, decyl, dodecyl, tetradecyl and octadecyl groups, alkenyl groups such as vinyl and allyl groups, aryl groups such as phenyl and tolyl groups and cycloalkyl groups such as cyclohexyl group as well as halogen-substituted monovalent hydrocarbon groups obtained by replacing a part or all of the hydrogen atoms in the above named hydrocarbon groups with halogen atoms such as 3,3,3-trifluoropropyl group, of which methyl group is preferred. The group denoted by $R^2$ at each molecular chain end is a hydrogen atom or an alkyl group having 1 to 6 carbon atoms such as methyl, ethyl, propyl, butyl, pentyl and hexyl groups, of which hydrogen atom is preferred.

When the complex viscosity of the diorganopolysiloxane as the component (A) is too low, good adhesion cannot be obtained between the substrate surface and the coating film formed thereon from the water-base composition along with poor slipperiness of the surface film. When the complex viscosity thereof is too high, the coating film formed from the composition has no good slipperiness.

The diorganopolysiloxane as the component (A) can be synthesized by a known method. For example, a cyclic diorganosiloxane oligomer represented by the general formula $(R^1_2SiO)_m$, in which $R^1$ has the same meaning as defined above and the subscript m is a positive integer of 3 to 7, is admixed with water or a low-viscosity alkoxy-terminated diorganopolysiloxane represented by the general formula $R^2O(R^1_2SiO)_nR^2$, in which $R^1$ and $R^2$ each have the same meaning as defined above and the subscript n is a positive integer up to 1000, in the presence of an alkaline catalyst such as an alkali metal hydroxide and the mixture is subjected to a siloxane rearrangement equilibration reaction.

Since the composition of the present invention is a water-base composition, the diorganopolysiloxane as the component (A), which is insoluble in water, must be dispersed in an aqueous medium in the form of an aqueous emulsion. When the diorganopolysiloxane has a very high viscosity, such a high-viscosity diorganopolysiloxane can hardly be dispersed in an aqueous medium even in the presence of an emulsifying agent. A stable aqueous emulsion of such a high-viscosity diorganopolysiloxane can be prepared by the method of so-called emulsion polymerization. Thus, the above mentioned cyclic diorganosiloxane oligomer of the general formula $(R^1_2SiO)_m$ is, either alone or as a mixture with the low-viscosity linear diorganopolysiloxane of the general formula $R^2O(R^1_2SiO)_nR^2$, uniformly dispersed and emulsified in water containing an emulsifying agent and subjected to the ring-opening polymerization reaction in the presence of a catalytic compound such as an acid or alkali followed by neutralization of the catalyst to inactivate the same.

The component (B) in the inventive water-base silicone composition serves as a crosslinking agent for the above described high-viscosity diorganopolysiloxane as the component (A). Namely, the component (B) is an organotrialkoxy silane compound represented by the general formula (II) given above or a partial hydrolysis-condensation product thereof. In the general formula (II), the group denoted by $R^3$ is a monovalent hydrocarbon group having 1 to 20 carbon atoms exemplified by alkyl groups such as methyl, ethyl, propyl, butyl, pentyl, hexyl, heptyl, octyl, decyl, dodecyl, tetradecyl and octadecyl groups, alkenyl groups such as vinyl and allyl groups, aryl groups such as phenyl and tolyl groups and cycloalkyl groups such as cyclohexyl group as well as substituted hydrocarbon groups obtained by replacing a part or all of the hydrogen atoms in the above named hydrocarbon groups with halogen atoms or organic groups having a mercapto group, acryl group and the like such as 3,3,3-trifluoropropyl, 3-methacryloxypropyl, 3-acryloxypropyl and 3-mercaptopropyl groups.

The group denoted by $R^4$ in the general formula (II) is alkyl group having 1 to 6 carbon atoms such as methyl, ethyl, propyl, butyl, pentyl and hexyl groups, of which methyl and ethyl groups are preferable.

Particular examples of the organotrialkoxy silane compound as the component (B) in the inventive water-base silicone composition include: methyl trimethoxy silane; methyl triethoxy silane; methyl tripropoxy silane; methyl tributoxy silane; ethyl trimethoxy silane; ethyl triethoxy silane; propyl trimethoxy silane; propyl triethoxy silane; butyl trimethoxy silane; pentyl trimethoxy silane; hexyl trimethoxy silane; octyl trimethoxy silane; decyl trimethoxy silane; dodecyl trimethoxy silane; tetradecyl trimethoxy silane; octadecyl trimethoxy silane; vinyl trimethoxy silane; vinyl triethoxy silane; phenyl trimethoxy silane; phenyl triethoxy silane; 3-methacryloxypropyl trimethoxy silane; 3-mercaptopropyl trimethoxy silane and 3,3,3-trifluoropropyl trimethoxy silane.

The amount of the component (B) in the inventive water-base silicone composition is in the range from 0.01 to 10 parts by weight or, preferably, from 0.1 to 5 parts by weight per 100 parts by weight of the component (A). When the amount of the component (B) is too small, the coating film formed from the composition cannot be fully cured while, when the amount of the component (B) is too large, the adhesive bonding strength between the coating film formed from the composition and the substrate surface cannot be high enough.

The component (C) in the inventive water-base silicone composition, which serves to improve the adhesive bonding between the coating film formed from the composition and the substrate surface is an organoalkoxy silane compound having an amido group and a carboxyl group in a molecule or a partial hydrolysis-condensation product thereof. The organoalkoxy silane compound having an amido group and a carboxyl group in a molecule can be synthesized by the reaction of an amino group-containing alkoxy silane compound with a dicarboxylic acid anhydride. Examples of the amino group-containing alkoxy silane compound as one of the reactants in the reaction include 3-aminopropyl trimethoxy silane, 3-aminopropyl triethoxy silane, 3-aminopropyl methyl dimethoxy silane, 3-aminopropyl methyl diethoxy silane, 3-(N-2-aminoethyl)aminopropyl trimethoxy silane, 3-(N-2-aminoethyl)aminopropyl triethoxy silane, 3-(N-2-aminoethyl)aminopropyl methyl dimethoxy silane and 3-(N-2-aminoethyl)aminopropyl methyl diethoxy silane. Examples of the dicarboxylic acid anhydride as the other reactant include phthalic acid anhydride, succinic acid anhydride, methyl succinic acid anhydride, maleic acid anhydride, glutaric acid anhydride, itaconic acid anhydride, adipic acid anhydride, pimelic acid anhydride, suberic acid anhydride, azelaic acid anhydride, sebacic acid anhydride and fumaric acid anhydride.

Examples of the amido and carboxyl group-containing organoalkoxy silane compound suitable as the component (C) in the inventive water-base silicone composition include those expressed by the following structural formulas:

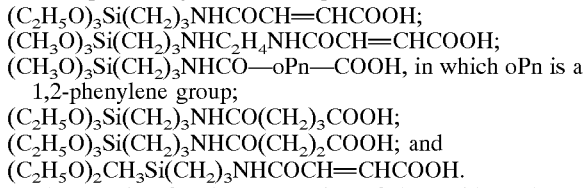

$(C_2H_5O)_3Si(CH_2)_3NHCOCH=CHCOOH$;
$(CH_3O)_3Si(CH_2)_3NHC_2H_4NHCOCH=CHCOOH$;
$(CH_3O)_3Si(CH_2)_3NHCO—oPn—COOH$, in which oPn is a 1,2-phenylene group;
$(C_2H_5O)_3Si(CH_2)_3NHCO(CH_2)_3COOH$;
$(C_2H_5O)_3Si(CH_2)_3NHCO(CH_2)_2COOH$; and
$(C_2H_5O)_2CH_3Si(CH_2)_3NHCOCH=CHCOOH$.

The reaction for the preparation of the amido and carboxyl group-containing organoalkoxy silane compound suitable as the component (C) is performed by blending the starting reactants mentioned above in a good solvent for both reactants, such as an alcohol solvent, and keeping the solution at room temperature to give the reaction product which should have at least one amido group and at least one carboxyl group in a molecule. Accordingly, the two reactants in conducting the reaction are blended in such a proportion that at least one mole of the dicarboxylic acid anhydride is provided per mole of the —NH— groups in the amino group-containing alkoxy silane compound or a partial hydrolysis-condensation product thereof.

The amount of the component (C) in the inventive water-base silicone composition is in the range from 1 to 10 parts by weight or, preferably, from 3 to 7 parts by weight per 100 parts by weight of the component (A). When the amount of the component (C) is too small in the composition, the coating film formed from the composition cannot exhibit good adhesion to the substrate surface while, when the amount thereof is too large, the coating film formed from the composition is imparted with increased stiffness with low stretching not to follow deformation of the substrate surface.

The component (D) in the inventive water-base silicone composition is an organoalkoxy silane compound having an epoxy group in the molecule or a partial hydrolysis-condensation product thereof which serves to impart the coating film formed from the composition with improved adhesion to the substrate surface.

Examples of such an epoxy group-containing organoalkoxy silane compound include 2-glycidoxyethyl trimethoxy silane, 2-glycidoxyethyl triethoxy silane, 3-glycidoxypropyl trimethoxy silane, 3-glycidoxypropyl triethoxy silane, 3-glycidoxypropyl methyl dimethoxy silane, 3-glycidoxypropyl methyl diethoxy silane, 2-(3,4-epoxycyclohexyl)ethyl trimethoxy silane and 2-(3,4-epoxycyclohexyl)ethyl triethoxy silane.

The amount of the component (D) in the inventive water-base silicone composition is in the range from 1 to 10 parts by weight or, preferably, from 3 to 7 parts by weight per 100 parts by weight of the component (A). When the amount of the component (D) is too small in the composition, the coating film formed from the composition cannot exhibit good adhesion to the substrate surface while, when the amount thereof is too large, the coating film formed from the composition is imparted with increased stiffness with low stretching not to follow deformation of the substrate surface.

The component (E) in the inventive water-base silicone composition is a curing catalyst which promotes the crosslinking reaction of the component (A). Examples of suitable catalytic compounds include organic tin compounds such as dibutyl tin dilaurate, dibutyl tin dioctoate, dioctyl tin dilaurate, dioctyl tin diacetate and tin octoate, organic zinc compounds such as zinc laurate, zinc acetate, zinc stearate and zinc octoate, tetrapropyl titanate and partial hydrolysis-condensation product thereof, and organic titanium compounds such as bis(dipropoxy) titanium, bis (acetylacetonato) titanium oxide, titanium lactate and ammonium titanium lactate. Among the above named catalytic compounds, those insoluble in water can be compounded in the inventive water-base silicone composition in the form of an aqueous emulsion prepared beforehand by emulsifying the compound in water containing a surface active agent as an emulsifier.

The amount of the component (E) in the inventive water-base silicone composition is in the range from 0.01 to 10 parts by weight or, preferably, from 0.1 to 2 parts by weight per 100 parts by weight of the component (A). When the amount of the component (E) is too small in the composition, the crosslinking reaction of the component (A) cannot be promoted as desired while no further improvement can be obtained in the crosslinking reaction of the component (A) even by increasing the amount thereof to exceed the above mentioned upper limit rather with an economical disadvantage.

The water-base silicone composition of the present invention can be prepared by mixing the above described essential ingredients, i.e. components (A) to (E) each in a specified amount, by using a suitable mixing machine equipped with stirrer blades of paddle type or anchor type known in the art. While the components (B), (C) and (D) can be compounded as such, the component (A) must be compounded with the other components in the form of an aqueous emulsion prepared in advance by emulsifying the component (A) in an aqueous medium containing an emulsifying agent. The component (E) can be compounded as such if the compound is soluble in water but it is compounded preferably in the form of an aqueous emulsion if the compound is insoluble or hardly soluble in water as is mentioned above.

It is of course optional according to need that the water-base silicone composition of the invention is compounded with various kinds of known additives each in a limited amount. Examples of such optional additives include carbon black, powders of a polymeric resin such as fluorocarbon resins, melamine resins, acrylic resins, polycarbonate resins, silicone resins and nylon resins, paraffin waxes, polyethylene waxes, silicone oils, organic and inorganic pigments, thickening agents, defoaming agents and antiseptic agents.

The water-base silicone composition of the invention is useful as a coating agent on the surface of various kinds of substrate materials or, in particular, rubber articles to form a coating film exhibiting excellent adhesion to the substrate surface and having excellent abrasion resistance and surface lubricity. The type of the rubber as the substrate material is not particularly limitative including natural rubber, EPDM rubbers, SBR, chloroprene rubbers, isoprene-isobutylene copolymeric rubbers and nitrile rubbers. Porous or spongy rubber articles can also be used as the substrate material for the surface treatment with the inventive composition. Fabric materials can also be used as the substrate of which the fibers can be any of synthetic and semi-synthetic fibers such as nylon, polyester, acrylic, formalized polyvinyl alcohol and cellulose acetate as well as natural fibers such as cotton, silk and wool.

The method for coating the surface of the above mentioned substrate materials with the inventive water-base silicone composition as the coating agent is not particularly limitative and can be conventional including the methods of brush coating, spray coating, roller coating, dipping and knife coating. The coated material is then kept standing at room temperature or under heating to effect drying of the coating film and curing of the composition on the substrate surface. The coating film after curing should have a thickness in the range from 0.1 to 20 μm or, preferably, from 0.5 to 10 μm. Since the rubber article thus treated with the inventive composition is imparted with excellent abrasion resistance and surface lubricity, improvements can be accomplished by the use of the inventive composition in various kinds of rubber articles such as weather strips in automobiles, sealing materials, e.g., O-rings, gaskets and packings, and rubber hoses.

In the following, the water-base silicone composition of the present invention is described in more detail by way of Examples and Comparative Examples, which, however, never limit the scope of the invention in any way, as preceded by the description of the synthetic procedures for the preparation of the components (A) and (C). In the following description, the term of "parts" always refers to "parts by weight". Evaluation of the water-base silicone compositions prepared in the Examples and Comparative Examples and the rubber articles treated with the composition was undertaken for the complex viscosity of the composition and for the surface lubricity and abrasion resistance of the rubber articles by the testing procedures described below.

(1) Complex viscosity of water-base silicone composition

The complex viscosity of the composition was determined at a constant frequency of 0.1 radian/second at 25° C. by using a controlled stress rheometer (Model CS, manufactured by Bohlin Co.) with a cone plate of 20 mm diameter as the fixture.

(2) Surface lubricity of rubber article

As is illustrated in FIG. 1, two strips 1,1 of a solid EPDM rubber each having dimensions of 10 mm by 50 mm by 2 mm were adhesively bonded to the surface of a 50 mm by 50 mm wide copper plate 4 to give a testing specimen which was moved in an upside-down disposition by sliding on a glass plate 5 by pulling at a velocity of 100 mm/minute under a load of 1 kg to determine the sliding resistance.

(3) Abrasion resistance of rubber surface

Figure 3:
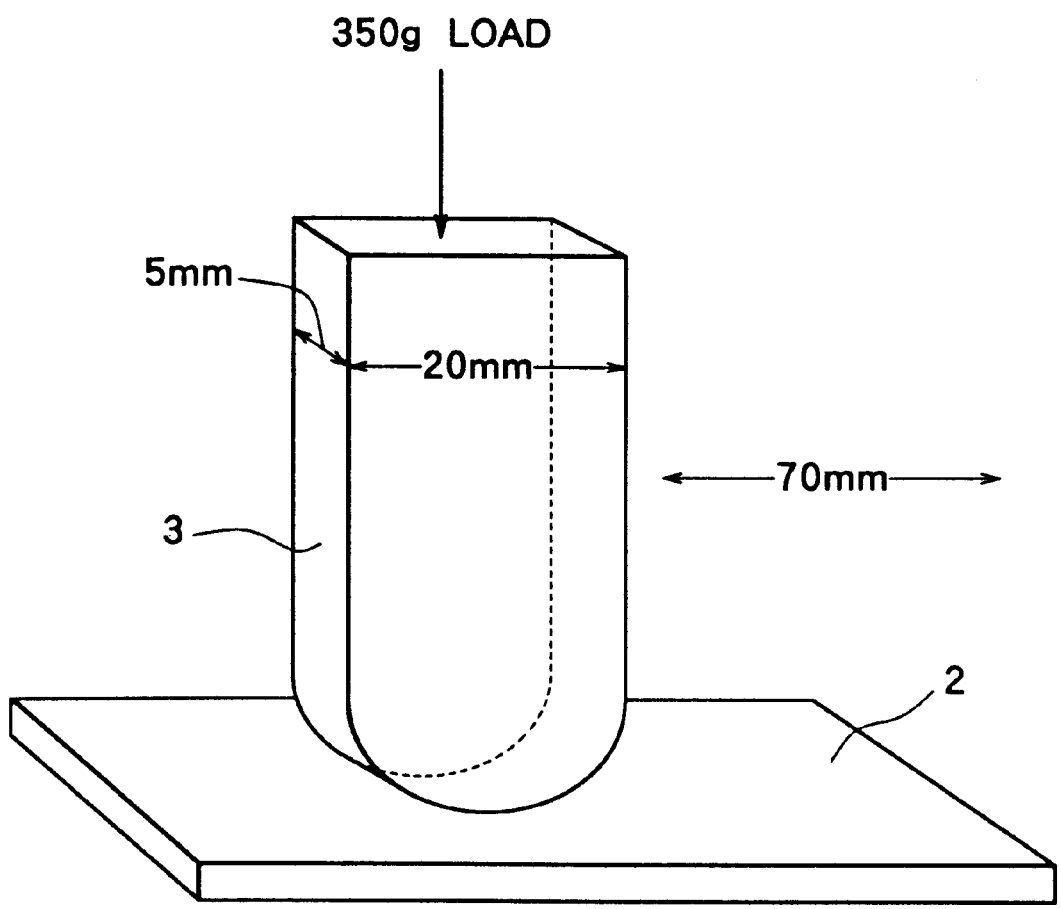
FIG. 3 is a perspective view of the testing assembly for the measurement of the abrasion resistance of the rubber surface.

A rubbing probe of glass 3 having a semicircular rubbing head as illustrated in FIG. 3, of which the surface of the rubbing head was roughened by grinding with sand paper (#AA 80), was mounted on a spongy rubber sheet 2 of an EPDM rubber having dimensions of 15 mm by 150 mm by 2 mm, bulk density of 0.63 g/cm³ and hardness, JIS A, of 36 in contact at the rubbing head and moved in reciprocation with a stroke of 70 mm at a frequency of 60 reciprocations/minute under a thrust load of 350 g to determine the minimum number of reciprocations until appearance of noticeable shaving of the rubber surface.

Synthesis of component (A) 1.

Into a glass beaker of 1 liter capacity were introduced 350 g of octamethyl cyclotetrasiloxane, 7 g of dodecylbenzene sulfonic acid and 133 g of water and the mixture was agitated by using a homomixer rotating at 6000 rpm so that phase inversion took place from a W/O-type emulsion to an O/W-type emulsion with a noticeable increase of the viscosity followed by further continued agitation for additional 10 minutes. In the next place, a 210 g portion of water was added to the emulsion under agitation at 2000 rpm of the homomixer and then the thus diluted emulsion was passed twice through a high-pressure homogenizer under a pressure of 300 kg/cm²G to give a stable aqueous emulsion.

The emulsion was then transferred to a glass flask of 1 liter capacity equipped with a stirrer, thermometer and reflux condenser and heated therein at 70° C. for 6 hours to effect the ring-opening polymerization of the octamethyl cyclotetrasiloxane. After standing at 25° C. for 12 hours to effect aging, 13 g of a 10% aqueous solution of sodium carbonate were added to the emulsion to neutralize the acid catalyst so that a uniform and stable aqueous emulsion having a pH of 6.4 and containing 45.7% of non-volatile matter as determined by drying at 105° C. for 3 hours was obtained, which is referred to as the emulsion A-1 hereinafter.

A volume of isopropyl alcohol was added to the emulsion A-1 to destroy the emulsion and the organopolysiloxane separated from the aqueous medium was extracted and dried by heating at 105° C. for 24 hours. Measurement of the complex viscosity was undertaken for the thus dried organopolysiloxane to give a value of 8.5×10⁵ centipoise. The gel permeation chromatographic analysis undertaken for this organopolysiloxane gave a result that the organopolysiloxane could be expressed by an average formula

$$HO-SiMe_2-O-(-SiMe_2-O-)_{3000}-SiMe_2-OH,$$

in which Me is a methyl group.

Synthesis of component (A) 2.

Into a glass beaker of 1 liter capacity were introduced 350 g of octamethyl cyclotetrasiloxane, 7 g of dodecylbenzene sulfonic acid and 133 g of water and the mixture was agitated by using a homomixer rotating at 6000 rpm so that phase inversion took place from a W/O-type emulsion to an O/W-type emulsion with a noticeable increase of the viscosity followed by further continued agitation for additional 10 minutes. In the next place, a 210 g portion of water was added to the emulsion under agitation at 2000 rpm of the homomixer and then the thus diluted emulsion was passed twice through a high-pressure homogenizer under a pressure of 300 kg/cm²G to give a stable aqueous emulsion.

The emulsion was then transferred to a glass flask of 1 liter capacity equipped with a stirrer, thermometer and reflux condenser and heated therein at 70° C. for 6 hours to effect the ring-opening polymerization of the octamethyl cyclotetrasiloxane. After standing at 15° C. for 12 hours to effect aging, 13 g of a 10% aqueous solution of sodium carbonate were added to the emulsion to neutralize the acid catalyst so that a uniform and stable aqueous emulsion having a pH of 6.6 and containing 46.0% of non-volatile matter as determined by drying at 105° C. for 3 hours was obtained, which is referred to as the emulsion A-2 hereinafter.

A volume of isopropyl alcohol was added to the emulsion A-2 to destroy the emulsion and the organopolysiloxane separated from the aqueous medium was extracted and dried by heating at 105° C. for 24 hours. Measurement of the complex viscosity was undertaken for the thus dried organopolysiloxane to give a value of $2.3 \times 10^6$ centipoise. The gel permeation chromatographic analysis undertaken for this organopolysiloxane gave a result that the organopolysiloxane could be expressed by an average formula

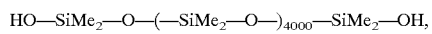
HO—SiMe$_2$—O—(—SiMe$_2$—O—)$_{4000}$—SiMe$_2$—OH, in which Me is a methyl group.

Synthesis of component (A) 3.

Into a glass beaker of 1 liter capacity were introduced 350 g of octamethyl cyclotetrasiloxane, 7 g of dodecylbenzene sulfonic acid and 133 g of water and the mixture was agitated by using a homomixer rotating at 6000 rpm so that phase inversion took place from a W/O-type emulsion to an O/W-type emulsion with a noticeable increase of the viscosity followed by further continued agitation for additional 10 minutes. In the next place, a 210 g portion of water was added to the emulsion under agitation at 2000 rpm of the homomixer and then the thus diluted emulsion was passed twice through a high-pressure homogenizer under a pressure of 300 kg/cm$^2$G to give a stable aqueous emulsion.

The emulsion was then transferred to a glass flask of 1 liter capacity equipped with a stirrer, thermometer and reflux condenser and heated therein at 85° C. for 16 hours to effect the ring-opening polymerization of the octamethyl cyclotetrasiloxane. The emulsion was then admixed with 13 g of a 10% aqueous solution of sodium carbonate to neutralize the acid catalyst so that a uniform and stable aqueous emulsion having a pH of 6.4 and containing 45.9% of non-volatile matter as determined by drying at 105° C. for 3 hours was obtained, which is referred to as the emulsion A-3 hereinafter.

A volume of isopropyl alcohol was added to the emulsion A-3 to destroy the emulsion and the organopolysiloxane separated from the aqueous medium was extracted and dried by heating at 105° C. for 24 hours. Measurement of the complex viscosity was undertaken for the thus dried organopolysiloxane to give a value of $7.4 \times 10^3$ centipoise. The gel permeation chromatographic analysis undertaken for this organopolysiloxane gave a result that the organopolysiloxane could be expressed by an average formula

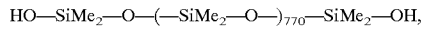
HO—SiMe$_2$—O—(—SiMe$_2$—O—)$_{770}$—SiMe$_2$—OH, in which Me is a methyl group.

Synthesis of component (C).

Into a glass flask equipped with a stirrer, thermometer and reflux condenser were introduced 108 g of maleic acid anhydride and 350 g of ethyl alcohol to prepare a uniform solution into which 242 g of 3-aminopropyl triethoxy silane were added drop-wise at room temperature over a period of 1 hour. After completion of addition of the silane compound, the reaction mixture in the flask was agitated for further 1 hour to give a light yellow, clear solution, referred to as the solution C hereinafter, containing 49.5% of non-volatile matter as determined by heating at 105° C. for 3 hours.

According to the results of analyses by the gel permeation chromatography, infrared absorption spectrophotometry and nuclear magnetic resonance spectrometry, the reaction product contained in the solution C was a compound expressed by the structural formula

HO—CO—CH=CH—CO—NH—C$_3$H$_6$Si(OEt)$_3$, in which Et is an ethyl group.

EXAMPLE 1

A water-base silicone composition, referred to as the composition 1 hereinafter, was prepared by blending:

80.1 parts of the emulsion A-1 for the component (A), 0.18 part of phenyl triethoxy silane as the component (B), 3.6 parts of the solution C for the component (C), 1.8 parts of 3-glycidoxypropyl trimethoxy silane as the component (D), 0.60 part of a 30% aqueous emulsion of dibutyl tin dilaurate, referred to as the emulsion E hereinafter, for the component (E), and 13.7 parts of water.

The thus prepared water-base silicone composition 1 was applied by brush coating onto the surface of a 2 mm thick non-porous rubber sheet and a 2 mm thick spongy rubber sheet as specified before and the coated rubber sheets were heated for 2 minutes in an air-circulation oven kept at 150° C. to effect curing of the coating film. The thus obtained surface-treated rubber sheets were subjected to the evaluation tests to give the results shown in Table 1, which also includes the amounts of the components (B) to (E) relative to the amount of the component (A) taken as 100.

EXAMPLE 2

The experimental procedure for the preparation and evaluation of a second water-base silicone composition, referred to as the composition 2 hereinafter, was substantially the same as in Example 1 excepting for the replacement of the emulsion A-1 with the same amount of the emulsion A-2.

The relative amounts of the respective components and the results of the evaluation tests are shown also in Table 1.

EXAMPLE 3

The experimental procedure for the preparation and evaluation of a third water-base silicone composition, referred to as the composition 3 hereinafter, was substantially the same as in Example 1 excepting for the replacement of phenyl triethoxy silane as the component (B) with the same amount of methyl triethoxy silane.

The relative amounts of the respective components and the results of the evaluation tests are shown also in Table 1.

EXAMPLE 4

The experimental procedure for the preparation and evaluation of a fourth water-base silicone composition, referred to as the composition 4 hereinafter, was substantially the same as in Example 1 excepting for the replacement of phenyl triethoxy silane as the component (B) with the same amount of n-decyl trimethoxy silane.

The relative amounts of the respective components and the results of the evaluation tests are shown also in Table 1.

EXAMPLE 5

The experimental procedure for the preparation and evaluation of a fifth water-base silicone composition, referred to as the composition 5 hereinafter, was substantially the same as in Example 1 excepting for the replacement of phenyl triethoxy silane as the component (B) with the same amount of n-vinyl triethoxy silane.

The relative amounts of the respective components and the results of the evaluation tests are shown also in Table 1.

EXAMPLE 6

The experimental procedure for the preparation and evaluation of a sixth water-base silicone composition, referred to as the composition 6 hereinafter, was substantially the same as in Example 1 excepting for the increase of the amount of the emulsion A-1 from 80.1 parts to 80.8 parts, decrease of the amount of the component (B) from 0.18 part to 0.07 part and decrease of the amount of water from 13.7 parts to 13.1 parts.

The relative amounts of the respective components and the results of the evaluation tests are shown also in Table 1.

EXAMPLE 7

The experimental procedure for the preparation and evaluation of a seventh water-base silicone composition, referred to as the composition 7 hereinafter, was substantially the same as in Example 1 excepting for the decrease of the amount of the emulsion A-1 from 80.1 parts to 79.6 parts, increase of the amount of the component (B) from 0.18 part to 0.43 part and increase of the amount of water from 13.7 parts to 14.0 parts.

The relative amounts of the respective components and the results of the evaluation tests are shown also in Table 1.

EXAMPLE 8

The experimental procedure for the preparation and evaluation of a eighth water-base silicone composition, referred to as the composition 8 hereinafter, was substantially the same as in Example 1 excepting for the decrease of the amount of the emulsion A-1 from 80.1 parts to 78.4 parts, increase of the amount of the solution C from 3.6 parts to 4.4 parts, increase of the amount of the component (D) from 1.8 parts to 2.2 parts, decrease of the amount of the emulsion E from 0.60 part to 0.59 part and increase of the amount of water from 13.7 parts to 14.2 parts.

The relative amounts of the respective components and the results of the evaluation tests are shown also in Table 1.

COMPARATIVE EXAMPLE 1

The experimental procedure for the preparation and evaluation of a first comparative water-base silicone composition, referred to as the composition 9 hereinafter, was substantially the same as in Example 1 excepting for the replacement of the emulsion A-1 with the same amount of the emulsion A-3.

The relative amounts of the respective components and the results of the evaluation tests are shown also in Table 1.

COMPARATIVE EXAMPLE 2

The experimental procedure for the preparation and evaluation of a second comparative water-base silicone composition, referred to as the composition 10 hereinafter, was substantially the same as in Example 1 excepting for the increase of the amount of the emulsion A-1 from 80.1 parts to 80.4 parts, decrease of the amount of water from 13.7 parts to 13.5 parts and omission of the component (B).

The relative amounts of the respective components are shown in Table 1 but the evaluation tests of the coating film could not be undertaken due to stickiness of the surface-treated rubber samples.

COMPARATIVE EXAMPLE 3

The experimental procedure for the preparation and evaluation of a third comparative water-base silicone composition, referred to as the composition 11 hereinafter, was substantially the same as in Example 1 excepting for the increase of the amount of the emulsion A-1 from 80.1 parts to 87.1 parts, increase of the amount of the component (B) from 0.18 part to 0.20 part, decrease of the amount of the solution C from 3.6 parts to 0.40 part, decrease of the amount of the component (D) from 1.8 parts to 0.20 part, increase of the amount of the emulsion E from 0.60 part to 0.65 part and increase of the amount of water from 13.7 parts to 14.4 parts.

The relative amounts of the respective components and the results of the evaluation tests are shown also in Table 1.

COMPARATIVE EXAMPLE 4

The experimental procedure for the preparation and evaluation of a fourth comparative water-base silicone composition, referred to as the composition 12 hereinafter, was substantially the same as in Example 1 excepting for the decrease of the amount of the emulsion A-1 from 80.1 parts to 67.9 parts, decrease of the amount of the component (B) from 0.18 part to 0.15 part, increase of the amount of the solution C from 3.6 parts to 9.2 parts, increase of the amount of the component (D) from 1.8 parts to 4.6 parts, decrease of the amount of the emulsion E from 0.60 part to 0.51 part and increase of the amount of water from 13.7 parts to 17.6 parts.

The relative amounts of the respective components and the results of the evaluation tests are shown also in Table 1.

As is shown in Table 1, the results of the evaluation tests were poor in each of Comparative Examples 1 to 4 due to the improper degree of polymerization of the component (A), omission of the component (B), unduly small amounts of the components (C) and (D) and unduly large amounts of the components (C) and (D), respectively.

TABLE 1

| Composition No. | | 1 | 2 | 3 | 4 | 5 | 6 | 7 | 8 | 9 | 10 | 11 | 12 |
|---|---|---|---|---|---|---|---|---|---|---|---|---|---|
| Relative amounts of components, parts | (A) | 100 | 100 | 100 | 100 | 100 | 100 | 100 | 100 | 100[1) ] | 100 | 100 | 100 |
| | (B) | 0.5 | 0.5 | 0.5 | 0.5 | 0.5 | 0.2 | 1.2 | 0.5 | 0.5 | 0 | 0.5 | 0.5 |
| | (C) | 5.0 | 5.0 | 5.0 | 5.0 | 5.0 | 5.0 | 5.0 | 6.2 | 5.0 | 5.0 | 0.5 | 15.0 |
| | (D) | 5.0 | 5.0 | 5.0 | 5.0 | 5.0 | 5.0 | 5.0 | 6.2 | 5.0 | 5.0 | 0.5 | 15.0 |
| | (E) | 0.5 | 0.5 | 0.5 | 0.5 | 0.5 | 0.5 | 0.5 | 0.5 | 0.5 | 0.5 | 0.5 | 0.5 |
| Kinematic friction coefficient | | 0.6 | 0.7 | 0.6 | 0.6 | 0.6 | 0.8 | 0.6 | 0.6 | 1.1 | 2) | 1.4 | 0.8 |
| Abrasion resistance, times rubbing | | 8,000 | 8,000 | 8,000 | 7,000 | 8,000 | 5,000 | 6,000 | 7,000 | 1,000 | 2) | 100 | 600 |

[1)] emulsion A-3
[2)] not tested

What is claimed is:

1. A water-base silicone composition which comprises, as uniformly dissolved or dispersed in an aqueous medium:

(A) 100 parts by weight of a diorganopolysiloxane of a linear molecular structure having a complex viscosity in the range from $1 \times 10^4$ to $1 \times 10^8$ centipoise at 25° C. and represented by the general structural formula $$R^2O\text{—}SiR^1{}_2\text{—}O\text{—}(\text{—}SiR^1{}_2\text{—}O\text{—})_p\text{—}SiR^1{}_2\text{-}OR^2,$$

in which $R^1$ is an unsubstituted or substituted monovalent hydrocarbon group having 1 to 20 carbon atoms, $R^2$ is a hydrogen atom or a monovalent hydrocarbon group having 1 to 6 carbon atoms and the subscript p is a positive integer in the range from 800 to 20000;

(B) from 0.01 to 10 parts by weight of an organotrialkoxy silane compound represented by the general formula $$R^3Si(OR^4)_3,$$

in which $R^3$ is an unsubstituted or substituted monovalent hydrocarbon group having 1 to 20 carbon atoms and $R^4$ is a monovalent hydrocarbon group having 1 to 6 carbon atoms or a partial hydrolysis-condensation product thereof;

(C) from 1 to 10 parts by weight of an organoalkoxy silane compound containing an amido group and a carboxyl group in the molecule or a partial hydrolysis-condensation product thereof;

(D) from 1 to 10 parts by weight of an organoalkoxy silane compound containing an epoxy group in the molecule or a partial hydrolysis-condensation product thereof; and (E) from 0.01 to 10 parts by weight of a curing catalyst.

2. The water-base silicone composition as claimed in claim 1 in which the group denoted by $R^1$ is a methyl group.

3. The water-base silicone composition as claimed in claim 1 in which the group denoted by $R^2$ is a hydrogen atom.

4. The water-base silicone composition as claimed in claim 1 in which the component (A) has a complex viscosity in the range from $1 \times 10^5$ to $1 \times 10^7$ centipoise at 25° C.

5. The water-base silicone composition as claimed in claim 1 in which the group denoted by $R^4$ is a methyl group or ethyl group.

6. The water-base silicone composition as claimed in claim 1 in which the amount of the component (B) is in the range from 0.1 to 5 parts by weight per 100 parts by weight of the component (A).

7. The water-base silicone composition as claimed in claim 1 in which the amount of the component (C) is in the range from 3 to 7 parts by weight per 100 parts by weight of the component (A).

8. The water-base silicone composition as claimed in claim 1 in which the amount of the component (D) is in the range from 3 to 7 parts by weight per 100 parts by weight of the component (A).

9. The water-base silicone composition as claimed in claim 1 in which the component (E) is selected from the group consisting of organic tin compounds, organic zinc compounds and organic titanium compounds.

10. The water-base silicone composition as claimed in claim 1 in which the amount of the component (E) is in the range from 0.1 to 2 parts by weight per 100 parts by weight of the component (A).

11. A composition according to claim 1, wherein $R^1$ is, in each case independently, unsubstituted alkyl, halogen-substituted alkyl, unsubstituted alkenyl, halogen-substituted alkenyl, unsubstituted aryl, halogen-substituted aryl, unsubstituted cycloalkyl, or halogen-substituted cycloalkyl.

12. A composition according to claim 1, wherein $R^1$ is, in each case independently, methyl, ethyl, propyl, butyl, pentyl, hexyl, heptyl, octyl, decyl, dodecyl, tetradecyl, octadecyl, vinyl, allyl, phenyl, tolyl, cyclohexyl, or 3,3,3-trifluoropropyl.

13. A composition according to claim 1, wherein $R^2$ is, in each independently, H or alkyl having 1 to 6 carbon atoms.

14. A composition according to claim 1, wherein $R^3$ is, in each case independently, alkyl, alkenyl, aryl or cycloalkyl, in each case being unsubstituted or substituted by halogen, mercapto, acryloxy or methacryloxy.

15. A composition according to claim 1, wherein $R^3$ is methyl, ethyl, propyl, butyl, pentyl, hexyl, heptyl, octyl, decyl, dodecyl, tetradecyl, octadecyl, vinyl, allyl, phenyl, tolyl, cyclohexyl, 3,3,3-trifluoropropyl, 3-methacryloxypropyl, 3-acryloxypropyl or 3-mercaptopropyl groups.

16. A composition according to claim 1, wherein $R^4$ is alkyl having 1 to 6 carbon atoms.

17. A composition according to claim 1, wherein Component (B) is methyl trimethoxy silane; methyl triethoxy silane; methyl tripropoxy silane; methyl tributoxy silane; ethyl trimethoxy silane; ethyl triethoxy silane; propyl trimethoxy silane; propyl triethoxy silane; butyl trimethoxy silane; pentyl trimethoxy silane; hexyl trimethoxy silane; octyl trimethoxy silane; decyl trimethoxy silane; dodecyl trimethoxy silane; tetradecyl trimethoxy silane; octadecyl trimethoxy silane; vinyl timethoxy silane; vinyl triethoxy silane; phenyl trimethoxy silane; phenyl triethoxy silane; 3-methacryloxypropyl trimethoxy silane; 3-mercaptopropyl trimethoxy silane or 3,3,3-trifluoropropyl trimethoxy silane.

18. A composition according to claim 1, wherein Component (C) is:
$(C_2H_5O)_3Si(CH_2)_3NHCOCH=CHCOOH$;
$(CH_3O)_3Si(CH_2)_3NHC_2H_4NHCOCH=CHCOOH$;
$(CH_3O)_3Si(CH_2)_3NHCO—oPn—COOH$, in which oPn is a 1,2-phenylene group;
$(C_2H_5O)_3Si(CH_2)_3NHCO(CH_2)_3COOH$;
$(C_2H_5O)_3Si(CH_2)_3NHCO(CH_2)_2COOH$; or
$(C_2H_5O)_2CH_3Si(CH_2)_3NHCOCH=CHCOOH$.

19. A composition according to claim 1, wherein group (D) is 2-glycidoxyethyl trimethoxy silane, 2-glycidoxyethyl triethoxy silane, 3-glycidoxypropryl trimethoxy silane, 3-glycidoxypropyl triethoxy silane, 3-glycidoxypropyl methyl dimethoxy silane, 3-glycidoxypropyl methyl diethoxy silane, 2-(3,5-epoxycyclohexyl)ethyl trimethoxy silane or 2-(3,4-epoxycyclohexyl)ethyl triethoxy silane.

20. A composition according to claim 1, wherein
$R^1$ is, in each case independently, unsubstituted alkyl, halogen-substituted alkyl, unsubstituted alkenyl, halogen-substituted alkenyl, unsubstituted aryl, halogen-substituted aryl, unsubstituted cycloalkyl, or halogen- substituted cycloalkyl;
$R^2$ is, in each independently, H or alkyl having 1 to 6 carbon atoms;
$R^3$ is, in each case independently, alkyl, alkenyl, aryl or cycloalkyl, in each case being unsubstituted or substituted by halogen, mercapto, acryloxy or methacryloxy; and $R^4$ is alkyl having 1 to 6 carbon atoms.

21. A water-base silicone composition consisting essentially of, as uniformly dissolved or dispersed in an aqueous medium:

(A) 100 parts by weight of a diorganopolysiloxane of a linear molecular structure having a complex viscosity in the range from $1 \times 10^4$ to $1 \times 10^8$ centipoise at 25° C. and represented by the general structural formula

in which $R^1$ is an unsubstituted or substituted monovalent hydrocarbon group having 1 to 20 carbon atoms, $R^2$ is a hydrogen atom or a monovalent hydrocarbon group having 1 to 6 carbon atoms and the subscript p is a positive integer in the range from 800 to 20000;

(B) from 0.01 to 10 parts by weight of an organotrialkoxy silane compound represented by the general formula

in which $R^3$ is an unsubstituted or substituted monovalent hydrocarbon group having 1 to 20 carbon atoms and $R^4$ is a monovalent hydrocarbon group having 1 to 6 carbon atoms or a partial hydrolysis-condensation product thereof;

(C) from 1 to 10 parts by weight of an organoalkoxy silane compound containing an amido group and a carboxyl group in the molecule or a partial hydrolysis-condensation product thereof;

(D) from 1 to 10 parts by weight of an organoalkoxy silane compound containing an epoxy group in the molecule or a partial hydrolysis-condensation product thereof;

(E) from 0.01 to 10 parts by weight of a curing catalyst; and (F) optionally, additives such as carbon black; polymeric resin powders, including fluorocarbon resins, melamine resins, acrylic resins, polycarbonate resins, silicone resins, and nylon resins; paraffin waxes; polyethylene waxes; silicon oils; organic and inorganic pigments; thickening agents; defoaming agents; and antiseptic agents.

* * * * *